United States Patent [19]
Azzazy

[11] Patent Number: 5,701,172
[45] Date of Patent: Dec. 23, 1997

[54] OPTICAL FLOWMETER

[75] Inventor: Medhat T. Azzazy, Laguna Niguel, Calif.

[73] Assignee: Gas Research Institute, Chicago, Ill.

[21] Appl. No.: 485,949

[22] Filed: Jun. 7, 1995

[51] Int. Cl.$^6$ .................................................. G01P 3/36
[52] U.S. Cl. ................................................. 356/28; 73/861
[58] Field of Search .................... 356/28, 28.5; 73/861

[56] References Cited

U.S. PATENT DOCUMENTS

| 3,446,558 | 5/1969 | Seaton . |
| 3,532,427 | 10/1970 | Paine . |
| 3,547,540 | 12/1970 | Shigemoto . |
| 3,604,807 | 9/1971 | Champagne . |
| 3,723,004 | 3/1973 | Brayton . |
| 3,897,152 | 7/1975 | Farmer et al. . |
| 4,063,814 | 12/1977 | Rhodes . |
| 4,201,467 | 5/1980 | Hartmann et al. . |
| 4,311,383 | 1/1982 | Ohtsubo . |
| 4,725,136 | 2/1988 | McCullough et al. . |
| 4,851,697 | 7/1989 | Schodl . |
| 4,864,515 | 9/1989 | Deck ........................................... 364/516 |
| 4,923,298 | 5/1990 | Dopheide et al. ........................ 356/28.5 |
| 4,927,263 | 5/1990 | de Groot et al. ........................ 356/5 |
| 5,148,229 | 9/1992 | Wiseall . |
| 5,268,739 | 12/1993 | Martinelli et al. . |
| 5,517,298 | 5/1996 | Devenport ................................ 356/28 |

Primary Examiner—Mark Hellner
Attorney, Agent, or Firm—Greer, Burns & Crain, Ltd.

[57] ABSTRACT

In keeping with one aspect of this invention, apparatus for measuring the flow of gas in a pipeline includes an optical transmitter, an optical receiver and a processor. The apparatus measures the flow of gas through a generally cylindrical gas pipeline, engine intake or the like. The transmitter includes a laser diode array and a collimator lens which are preferably located outside of the pipeline, or in the wall of the pipeline. The transmitter generates multiple, spaced, discrete laser spots in the pipeline. Particles in the gas scatter the light as they pass through it, and the scattered light is received by another collimator lens and photodetector, which are also preferably outside of or in the wall of the pipeline. The output of the photodetector is processed by a computer which calculates the velocity of the particles and hence the flow rate of the gas. Pre-recorded holographic film can also be used in the transmitter and receiver to create holographic images at several different radii in the pipeline. In that case, the computer also calculates the volumetric flow rate of gas flowing through different parts of the pipeline, and can reveal the presence of turbulence in the pipeline.

8 Claims, 9 Drawing Sheets

S/N THRESHOLD =1dB, FFT LENGTH=128
ADAPTIVE PROCESS, DIGITAL FILTER OFF

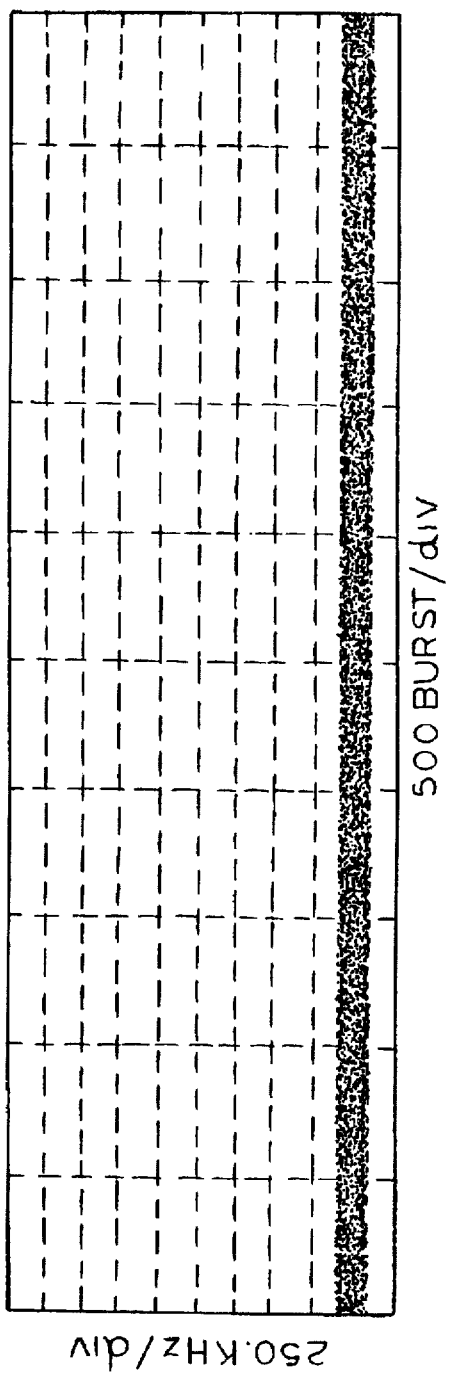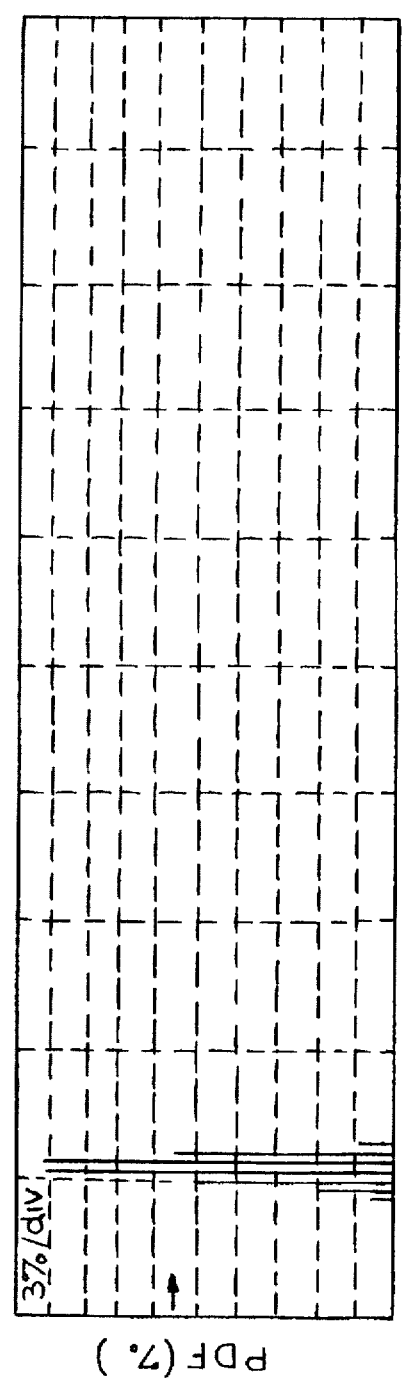
FIG. 9A
FIG. 9B

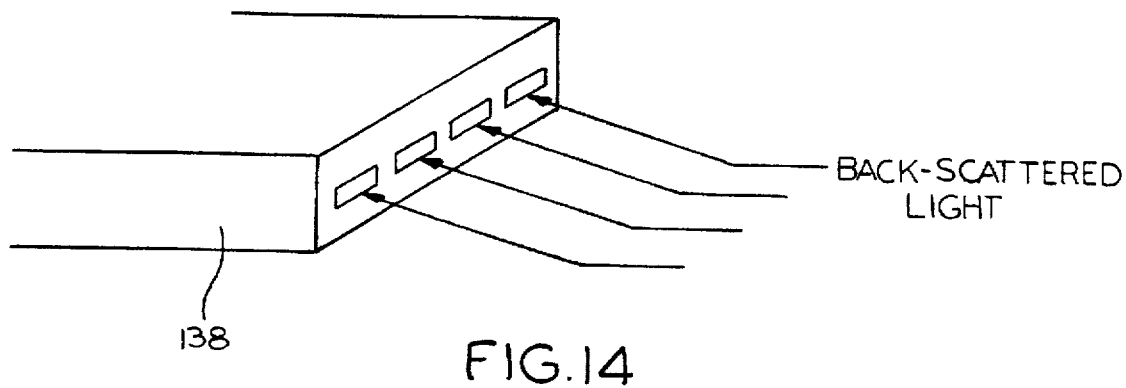
FIG. 14
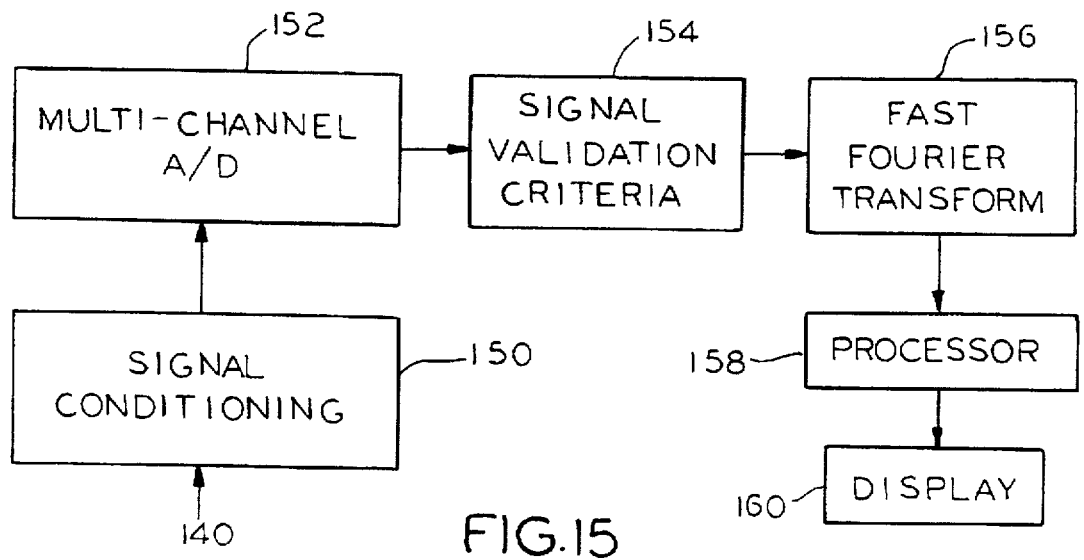
FIG. 15
| FOCI LOCATION (mm) (RELATIVE TO HOLOGRAM) | FOCI LOCATION (mm) (RELATIVE TO PIPE WALL) | RELATIVE LASER INTENSITY | SPOT SIZE (μm) | SSR |
|---|---|---|---|---|
| 60.00 | 50.00 | 113 | 4.8 | 664 |
| 68.42 | 43.18 | 102 | 5.4 | 411 |
| 76.04 | 35.56 | 109 | 5.9 | 321 |
| 83.66 | 27.94 | 135 | 6.5 | 252 |
| 91.28 | 20.32 | 121 | 7.1 | 144 |
| 96.36 | 15.24 | 131 | 7.5 | 105 |
| 101.44 | 10.16 | 149 | 7.9 | 94 |
| 106.52 | 5.10 | 146 | 8.3 | 73 |
| 110.33 | 1.27 | 149 | 8.5 | 101 |
FIG. 16

| TECHNIQUE/ NOZZLE | NOZZLE #2 RE=4.5×10⁴ | | NOZZLE #3 RE=12.5×10⁴ | | NOZZLE #2 & #3 RE=1.7×10⁵ | |
|---|---|---|---|---|---|---|
| | CFH | RATIO* | CFH | RATIO* | CFH | RATIO* |
| DAV/HOE | 7,864 | 1.006 | 21,167 | 1.0069 | 28,703 | 1.0058 |
| SCANNING DAV (9-POINTS) | 7,598 | 1.0005 | 21,005 | 1.0018 | 28,552 | 0.99965 |
| SCANNING LDV (9-POINTS) | 7,631 | 1.0049 | 21,080 | 1.0053 | 28,615 | 1.0019 |
| SCANNING DAV (45-POINTS) | 7,596 | 1.0002 | 20,998 | 1.0015 | 28,561 | 0.99995 |
| SCANNING LDV (45-POINTS) | 7,629 | 1.0046 | 21,074 | 1.005 | 28,606 | 1.0016 |

*RATIO = $\dfrac{\text{VOLUMETRIC FLOW RATE}}{\text{SONIC NOZZLE VOLUMETRIC FLOW RATE}}$

FIG.17

OPTICAL FLOWMETER

This invention relates to apparatus for measuring the flow rate of gas, and more particularly, to optical flowmeters for measuring volumetric flow rates in natural gas pipelines.

BACKGROUND OF THE INVENTION

With as much as 20 trillion cubic feet of natural gas exchanging custody every year at various metering stations, it is important to measure the flow rate as accurately as possible, because metering errors are very costly. Orifice plate flowmeters, which are the current industry standard, have about a 1% uncertainty in measuring the volumetric flow rate when they are first installed in a pipeline, and deteriorate to about 5% after six months of operation. This error rate is believed to cost the gas industry billions of dollars every year. Thus, there is a need for more accurate measuring equipment for natural gas flowing through pipelines.

The accuracy of gas measuring equipment has been improved using upstream flow conditioners and flow straighteners, but such devices create an unrecoverable pressure loss. Frequency response is usually slow, as well, which makes accurate measurements in oscillating flows very difficult to obtain. Moreover, available equipment does not yield any information about the nature of the flow, such as the shape of the velocity profile or turbulence levels. Thus, there is also a need for gas flow measuring equipment which does not create unrecoverable pressure losses, with high frequency response. There is also a need for gas flow measuring equipment which yields information about velocity profiles and turbulence levels.

Accordingly, one object of this invention is to provide improved methods and apparatus for measuring gas flow rates.

Another object is to provide improved gas flowmeters which are more accurate than current flowmeters.

Still another object is to provide improved gas flowmeters which do not interfere with gas flow in the measuring process.

Yet another object is to provide improved gas methods and apparatus for measuring flow which yield information about velocity profiles and turbulence levels.

SUMMARY OF THE INVENTION

In keeping with one aspect of this invention, apparatus for measuring the flow of gas in a pipeline includes an optical transmitter, an optical receiver and a processor. The apparatus measures the flow of gas through a generally cylindrical gas pipeline, and could also measure gas flow in an engine intake or the like. In one embodiment of the invention, the transmitter includes a laser diode array and a collimator lens which are preferably located outside of the pipeline, with the ability to transmit light into the pipeline. The diode array generates multiple discrete laser light spots in the pipeline. The light spots are located close to each other, within an area known as a probe volume. Particles in the gas scatter the light as they pass through the discrete light spots, and the scattered light is received by another optical system and a photodetector, which are also preferably outside of or in the wall of the pipeline. The output of the photodetector is processed by a computer which calculates the velocity of the particles and hence the flow rate of the gas.

In another embodiment of the invention, several probe volumes are created by passing the light of the transmitter diode array through pre-recorded holographic film, which acts like multiple lenses having different focal lengths. The different focal lengths of the lenses create probe volumes at various radii in the pipeline. When light is passed through the holographic film by the transmitter diode array, holographic images of the probe volumes are created at each focal point. Particles passing through the focal points scatter the light, reflecting some of it to the receiver. The receiver also has a pre-recorded holographic film having a focal distance which corresponds to a respective probe volume in the pipeline. The holographic film passes the reflected light from each probe volume to a dedicated photodetector in a receiver detector array, which generates signals indicative of the passing particles. The signals are processed in a computer to calculate the volumetric flow rate of the gas. Because measurements are made at several radii in the pipeline, however, the computer can also calculate a velocity profile of gas flowing through different parts of the pipeline, can identify the presence of turbulence in the pipeline, and can calculate the volumetric flow rate.

BRIEF DESCRIPTION OF THE DRAWINGS

These and other objects of the invention, and the manner of obtaining them will become more apparent, and will be better understood with reference to the following description, taken in conjunction with the drawings, in which:

FIG. 9(A) is a probability distribution function of the individual burst frequency.

FIG. 9(B) shows the velocity time history of the burst frequency shown in FIG. 9(A).

FIG. 14 is a diagram of the receiver used in the apparatus of FIG. 13.

FIG. 15 shows signal processing equipment used to process data generated by the apparatus shown in FIG. 13.

FIG. 16 is a chart showing the characteristics of experimental probe volumes using a 9 point holographic optical element lens (HOE) in accordance with the invention.

FIG. 17 is a chart showing the results obtained using an embodiment of the invention made in accordance with the apparatus of FIG. 13.

DETAILED DESCRIPTION

Two embodiments of this invention will be described. The first embodiment measures flow velocity at a single place in a pipeline, and the second embodiment calculates volumetric flow rate and a velocity profile by measuring flow velocity in several places in the pipeline.

Figure 1:
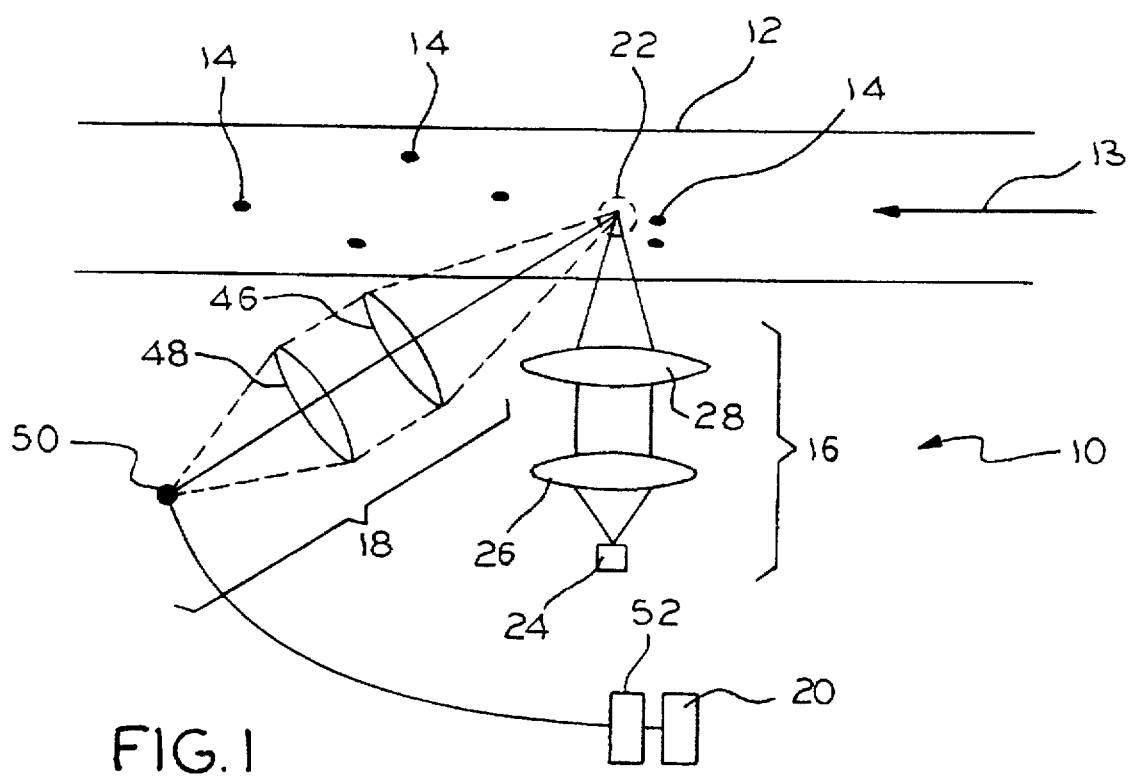
FIG. 1 is a diagram of apparatus made in accordance with the principles of one embodiment of the present invention.

The velocity measurement technique used in both embodiments of this invention is called diode array velocimetry (DAV). As seen in FIG. 1, apparatus 10 is provided for measuring the flow velocity of gas in a pipeline 12. The gas flows in a direction 13, and includes a plurality of random particles 14, such as dust, rust, oil droplets and the like.

The apparatus 10 includes a transmitter 16, a receiver 18, and a computer processor 20. Generally, the transmitter 16 transmits laser light to a probe volume 22 inside the pipe 12. Light transparent windows may be installed in the pipe for this purpose, as needed. The light is scattered by particles 14 which pass through the probe volume 22, and the receiver 18 detects the scattered light. Signals generated by the receiver 18 are processed in the processor 20, which calculates the velocity of the particles 14, and hence the velocity of the gas inside the pipeline 12 at the probe volume 22.

The transmitter 16 includes an array of laser diodes 24, a collimating lens 26 and a second optical lens 28. The lens 26 might have a focal length of perhaps 12.5 mm, and the lens 28 could have a focal length of about 100 mm. The lens 28 focuses light from the diode array 24 in the probe volume 22.

Figure 2:
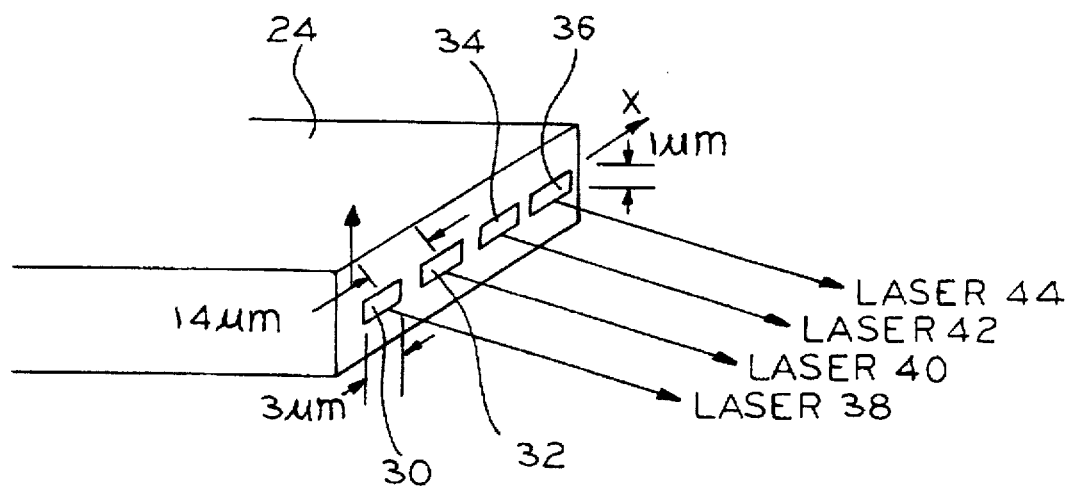
FIG. 2 is a diagram of a diode array used in the apparatus of FIG. 1.

The diode array 24, shown in greater detail in FIG. 2, may include four individually addressable, monolithic integrated semi-conductor laser diodes 30, 32, 34 and 36 such as those manufactured by Spectra Diode Laboratory (Model No. S-9130). The diodes 30, 32, 34, 36 generate laser beams 38, 40, 42 and 44, respectively. The laser diodes may be driven by four laser diode drivers made by ILX (Model No. ILX-3412).

Individually addressable laser diode arrays are electrically and optically isolated from one another. By controlling the injection current to each laser diode, the multiple outputs of individually addressable laser diodes can be kept uniform. Electrically isolated laser diodes do not have laser-to-laser cross talk and hence can yield 100% modulation depth. Since the lasers are optically isolated, the far-field intensity distribution of individually addressable laser diodes is Gaussian, without the double peaks associated with a phase coupled stripe laser diode array, for example. A Gaussian distribution is preferable for processing data, as will be seen.

Since the apparatus 10 uses individually addressable diodes, the individual beams can be externally modulated to produce an optical pattern at the probe volume 22 similar to that generated by Bragg-shifted laser Doppler velocimetry systems. In this manner, sensitivity to flow direction in the pipe can be achieved. It is contemplated that two- and three-dimensional velocity measurements could be made by using two or three laser arrays at orthogonal angles. The scattered radiation from a seed particle crossing such a multiple component probe volume could be separated into its orthogonal components by pulsing the orthogonal arrays at different frequencies.

Figure 3:
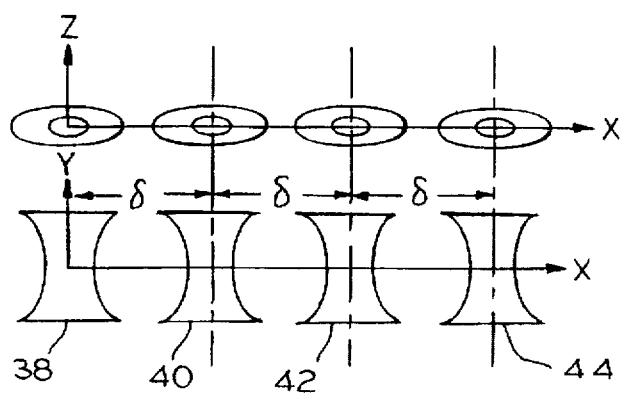
FIG. 3 is a diagram showing four focal points within a single probe volume, as made by the apparatus of FIG. 1.

When the laser light reaches the probe volume 22, the lasers 38, 40, 42 and 44 are in focus, separated by a distance $\delta$, as seen in FIG. 3. The distance $\delta$ might be about 20–100 μm. The probe volume 22 is large enough so that particles 14 passing through each beam produce a time dependent signal in the receiver 18, such as that shown in FIG. 4.

The light 14 which passes through the probe volume 22 is scattered by the particles, and passes through a lens 46 in the receiver 18. The collected light then passes through a focussing lens 48 to a waveguide 50 (FIG. 1). The lens 46 might have a focal length of perhaps 180 mm, and the lens 48 might have a focal length of perhaps 60 mm. Light in the waveguide passes to an avalanche photodetector 52. The avalanche photodetector can be Model C30817 manufactured by EG&G Optoelectronics (formerly GE/RCA). The avalanche photodetector which generates electrical signals which are sent to the processor 20.

Figure 6:
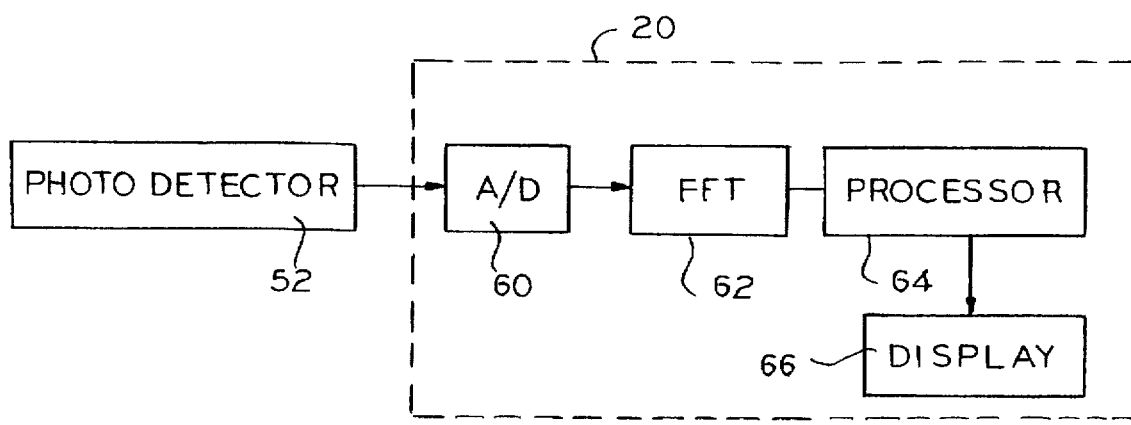
FIG. 6 is a block diagram of apparatus used to process signals generated by the receiver shown in FIG. 5.

The processor 20 (FIG. 6) includes one or more analog to digital converters 60, a fast Fourier transform module (FFT) 62, such as AT&T DSP32C, a computer processor 64 and a display 66. The processor 20 uses the data generated by the avalanche photodetector 52 to calculate the velocity of the particles and gas in the pipe.

The DAV technique is based upon the generation of multiple discrete laser spots (four or more) separated by short distances (20–100 μm) at the probe volume 22. The frequency content of signals generated by particle passage through the probe volume 22 can be analyzed by the FFT 62 and processor 64 using known fast Fourier transform techniques. The velocity is then determined from the product of frequency and laser-to-laser separation at the probe volume 22.

Figure 4:
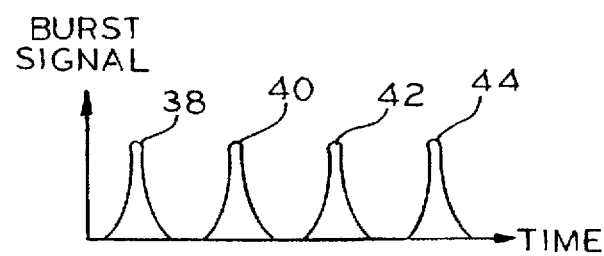
FIG. 4 is a graph of a time dependent signal generated in the receiver of the apparatus of FIG. 1 by a particle passing through the probe volume of FIG. 3.
Figure 5:
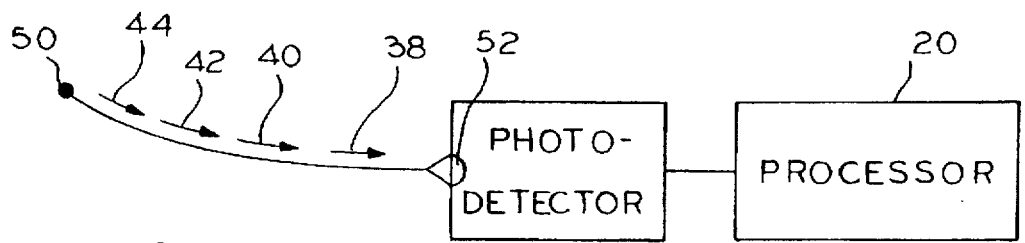
FIG. 5 is a block diagram of the receiver used in the apparatus of FIG. 1.

The basic concept of DAV is to image the output array of laser diodes 24 in the probe volume 22 as shown in FIG. 3. FIG. 3 shows the profiles of the array outputs in both the x-y and x-z planes. The time dependent signal generated by a particle crossing the optical pattern at the probe volume 22 is composed of a number of pulses, as shown in FIG. 4. The pulses correspond to scattered radiation from the image of the laser diode array 24. The velocity component, u, parallel to the longitudinal x-axis is determined from the spacing, $\delta$, between spots and the measured frequency, f, of the signal, namely, $u = \delta f$.

The intensity distribution of a laser diode is generally described by an elliptic Gaussian function such that $$I(x,y) = I_o e^{-2\left[\frac{x^2}{w_x^2} + \frac{y^2}{w_y^2}\right]} \qquad (1)$$

where $w_x$ and $w_y$ are the $1/e^2$ half width of the Gaussian function. However, in most practical applications, the beam divergence in the direction normal to the diode junction, i.e., parallel to the y-direction in FIG. 3, is larger than the divergence along the diode junction, i.e., parallel to the x-direction in FIG. 3. When the output beam of the laser diode is collimated by lens 26, the difference in beam divergence usually results in truncating the collimated beam in the direction normal to the diode junction. In that case, the laser beam intensity is described by the product of a Gaussian function along the diode junction (x) and a truncated Lorentz function along the direction normal to the diode junction (y). Thus, the intensity distribution of a single laser diode, $I_i$, can be described by the relationship.

$$I_s(x,y) = I_x(x) \cdot I_y(y) \qquad (2)$$

where $$I_x(x) = I_{xo} e^{-2\left(\frac{x}{w_x}\right)^2} \qquad (3)$$

and $$I_y(y) = I_{yo} \begin{cases} \dfrac{w_y^2}{w_y^2 + y^2} & |y| \leq R_L \\ 0 & \text{otherwise} \end{cases} \qquad (4)$$

where $R_L$ is the radius of the collimating lens.

The optical pattern generated by the array of laser diodes 30, 32, 34 and 36 can be described by summing the output of a single laser diode over the array. Since the array extends in the x-direction, only $I_x$ will be considered in the following analysis. Therefore, the optical pattern at the probe volume 22 can be expressed by the relationship $$I(x) = \sum_{k=1}^{N_L} I_x[x - (k-1)\delta] \qquad (5)$$

where $N_L$ is the number of lasers.

The collected scattered radiation generated by a particle traversing the probe volume 22 is proportional to the laser intensity at the probe volume 22. Substituting x=ut, where u is the velocity component along the x-direction, the time dependent signal becomes $$S(t) = I_{xo} \sum_{k=1}^{N_L} e^{-2\left[\frac{ut-(k-1)\delta}{w_x}\right]^2} \qquad (6)$$

The DAV signal characteristics described by equation (6) resemble certain fringe laser Doppler velocimetry (LDV) signal characteristics. Both techniques have a Gaussian exponential term, and both have a periodic component along the x-direction, i.e., direction of the velocity component to be measured.

The burst signal shown in FIG. 4 is digitized at a rate of R (samples per second). The number of samples n in a burst is Rt, where t is the particle transit time through the probe volume 22. Discrete Fourier transform analysis is usually performed on m samples where m=$2^N$ (where N is an integer). In general, the Fourier transform length m must be equal to or larger than the burst sample array n. Since the particle transit time is a function of the velocity, the Fourier transform length m is selected such that m≥$n_{max}$, where $n_{max}$ is the number of digital samples that correspond to the maximum transit time (minimum velocity). Therefore, for a given velocity range, both R and m are fixed and consequently, the frequency resolution $\Delta f$ becomes $$\Delta f = \frac{f_{max} - f_{min}}{m} = \frac{R}{m} \qquad (7)$$

where $f_{max}$ and $f_{min}$ are determined from the Nyquist limit $$f_{max} = -f_{min} = \frac{R}{2}.$$

Two observations regarding equation (7) are noteworthy. First, for the same Fourier transform length, as R increases the number of burst samples, n increases until it equals the Fourier transform length. Any increase in R after this limit will result in clipping. Second, for the same R, as m increases, the number of zero fills (m-n) becomes larger, which results in a strong low frequency lobe. The lobe must be removed by filtering to avoid detection of an erroneous burst frequency. Therefore, increasing the Fourier transform length must be accompanied by an increase in the digitization rate.

To clarify the latter point, consider the Fourier transform S(f) and power spectrum $2/S(f)/^2$ of the (unfiltered) signal in equation (6). The unfiltered power spectrum can be derived as $$2/S(f)/^2 = \frac{4\pi}{(u/w_x)^2} e^{-\left(\frac{\pi w_x f}{u}\right)^2} \cos^2\left(\frac{\pi \delta f}{u}\right) \cos^2\left(\frac{2\pi \delta f}{u}\right) \qquad (8)$$

Notice that the power spectrum appears as a modulated cosine of frequency u/δ (the desired frequency), with a Gaussian envelope of characteristic extent $u/w_x$, which controls the size of the cosine peaks.

Figure 7A:
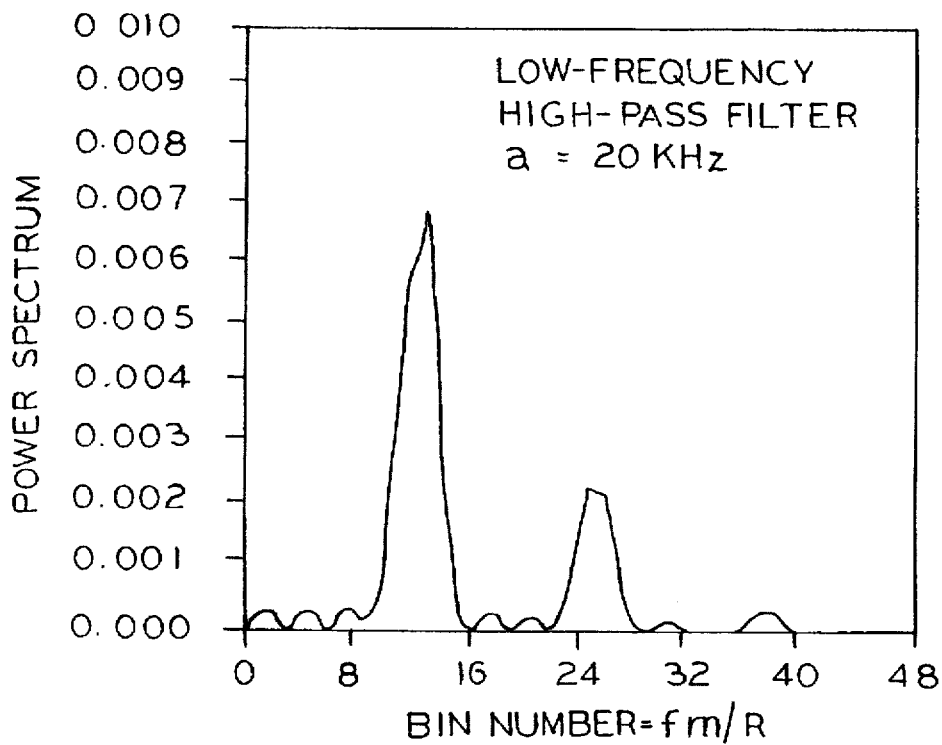
FIG. 7(A) is a graph of a modified power spectrum in a filtered time signal, measured in an experiment using the apparatus of FIG. 1.
Figure 7B:
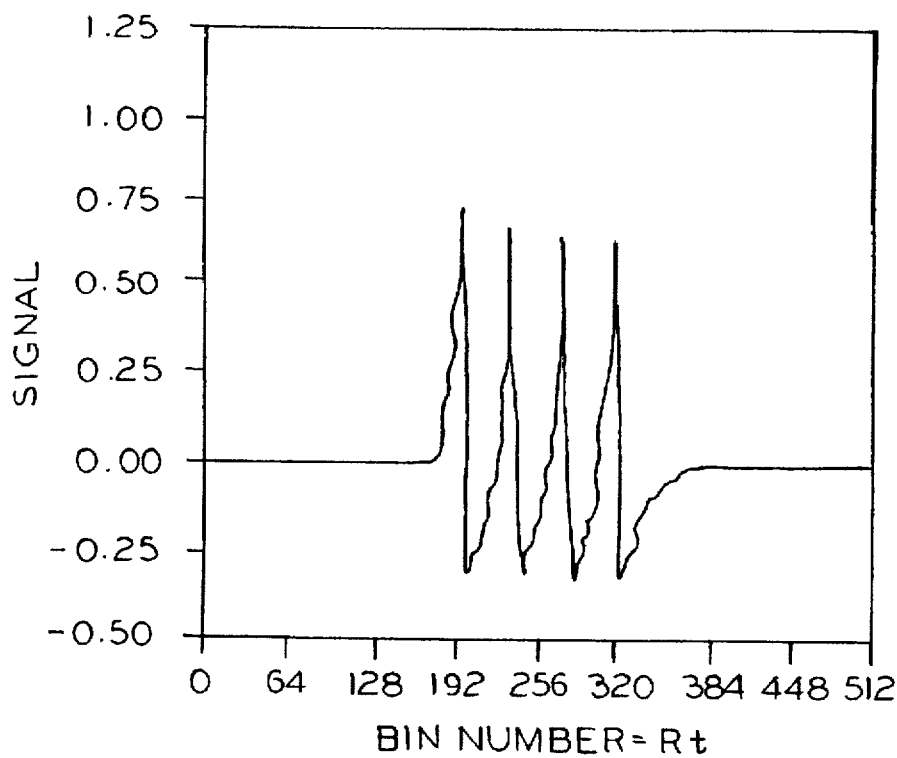
FIG. 7(B) is a graph showing the burst of FIG. 7(A) centered through pre-triggering.

In an actual experiment, the scattered signal was digitized. An FFT was used to compute the power spectrum of the signal. A simple low-frequency (high-pass) filter was used to diminish the strong lowest-nonzero-frequency lobe. The transfer function for this filter, which multiples Eq. (8), is $$|H(f)| = \left[\frac{\tan^2(\pi f/R)}{\tan^2(\pi f/R) + a^2}\right]^{1/2} \qquad (9)$$

where a is a lower cut-off frequency between R/m and u/δ. In the actual experiment, an analog high-pass RC filter was used as defined by equation (9). The modified (filtered) power spectrum, the product of Eqs. (8) and (9), was searched for the biggest local maximum, which located the desired frequency, u/δ. The modified power spectrum and corresponding filtered time signal are illustrated in FIG. 7(A). Here, pre-triggering was used to center the burst (FIG. 7(B)). Other techniques, including use of window functions (e.g., Hanning) and bin interpolation, enhance frequency centroiding. Note also, in FIG. 7(B) that the Eq. (9) filter acts as a time-derivative operator in the lower frequency regime. This produces a "sign alternating" characteristic in the signal, and thereby removes the DC component and strong lowest-nonzero-frequency lobe in the signal's power spectrum.

In the actual experiment utilizing the principles of this aspect of the invention, an individually addressable monolithic integrated semiconductor laser diode array manufactured by "Spectra Diode Lab" was used as a source of light. The diode array had 4 lasers emitting 30 mW per laser at 780 nm. The center-to-center separation of the lasers was 14 μm. The beam size was 3 μm in the parallel direction, and 1 μm in the perpendicular direction, as shown in FIG. 2.

The diode array output was collimated using a 12.5 mm focal length lens. The beam was then focused into the probe volume using a 100 mm focal length lens. An F/5, 180 mm focal length lens collected and collimated the scattered radiation from the probe volume. The collimated scattered radiation was then focused onto a 100 μm core multi-mode optical fiber using a 60 mm focal length lens. The other end of the fiber was connected to an avalanche photodetector (APD).

The signal from the APD was electronically conditioned with an analog RC bandpass filter, and then it passed into the data acquisition and processing system. Four digital signal processor (DSP) chips were used to perform fast Fourier transforms on the signal. The transit frequency was determined using the previously stated interpolation technique.

Two types of measurements were performed: controlled tests and wind tunnel tests. The controlled tests were carried out using a wire projecting from the edge of a rotating wheel to simulate particles passing through the probe volume. The signals from the wire had fixed amplitude, frequency, and arrival time. The speed of the rotating disc was set in the range 5–40 m/sec.

The flow tests were performed in a low speed wind tunnel test facility. The test section was 10 cm in diameter and located 50 diameters downstream from the wind tunnel inlet. Reynolds number based upon the centerline velocity and test section diameter varied from $3 \times 10^4$ to $2 \times 10^5$.

Figure 8A:
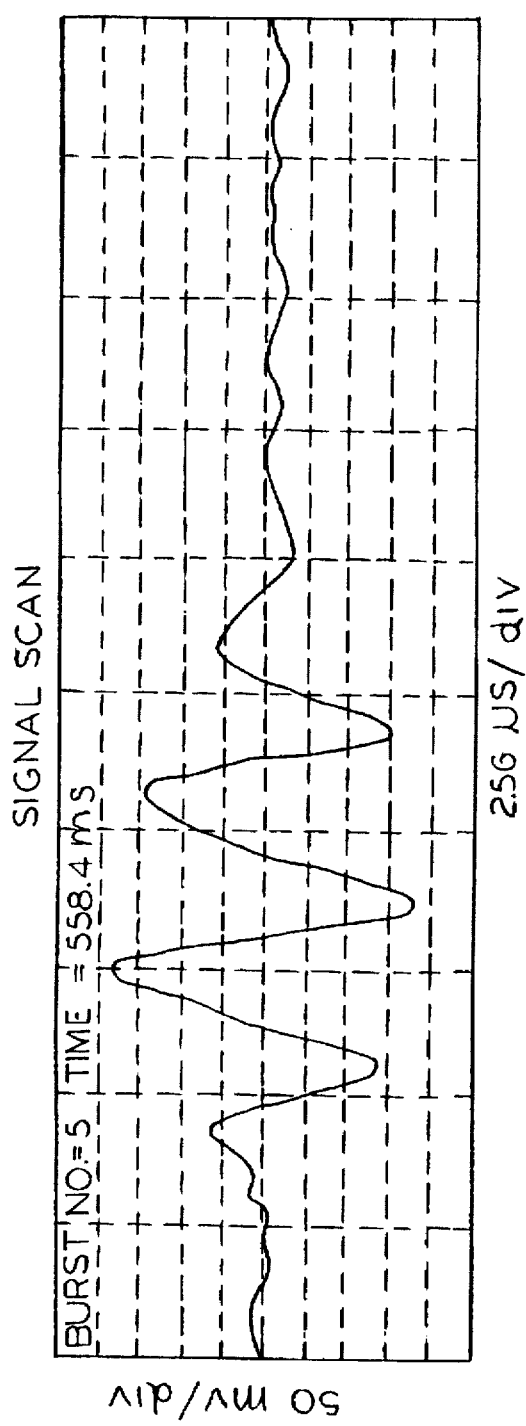
FIG. 8(A) is a time trace of a typical signal output caused by a particle crossing a probe volume in the apparatus of FIG. 1.
Figure 8B:
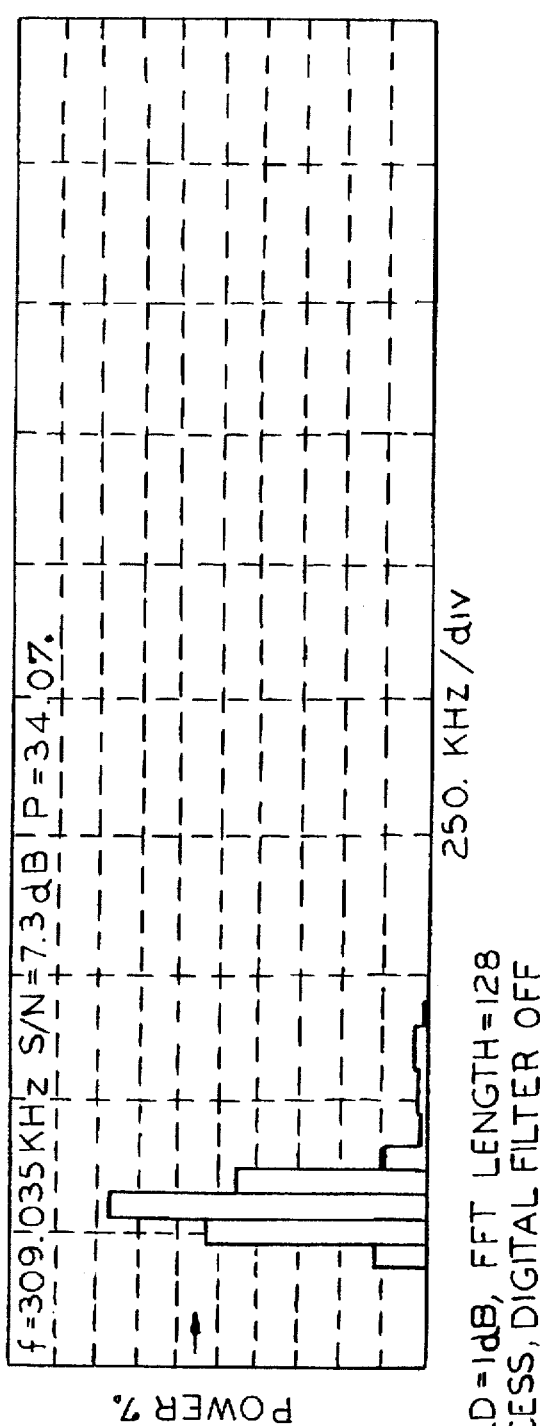
FIG. 8(B) is a graph showing the Fourier transform of the burst of FIG. 8(A).

FIG. 8(A) shows the time trace of a typical signal output from the APD due to a particle crossing the probe volume. The four signals correspond to scattering from the four laser beams at the probe volume. FIG. 8(B) shows the Fourier transform of the burst.

A probability distribution function of the individual burst velocity was constructed, as shown in FIG. 9(A). FIG. 9(B) shows the velocity time history.

The DAV probe volume was imaged in the far field using a microscope objective. The far field intensity distribution was mapped using a 100 μm core optical fiber connected to an APD. The laser-to-laser intensity distribution was kept uniform by controlling the injection current to each laser.

The beam-to-beam separation at the probe volume was measured by imaging the probe volume on a far-field screen using a microscope objective. A USAF resolution target (2.2 μm between lines) was also imaged by the same microscope objective to provide a calibration scale on the screen. The beam-to-beam separation at the laser was 14 μm ±0.05%.

Figure 10:
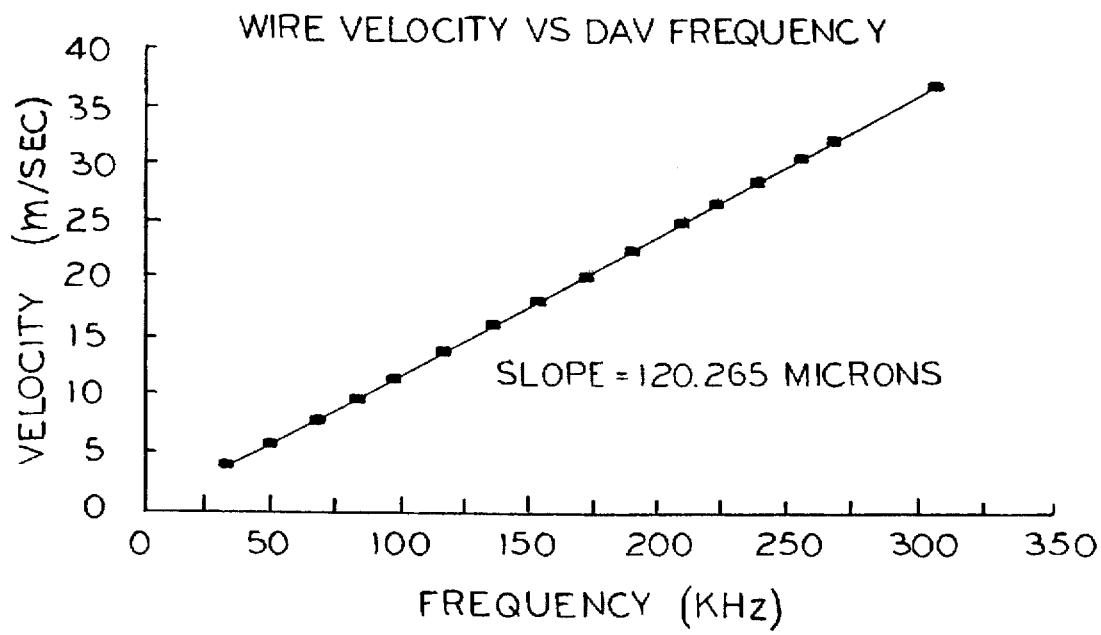
FIG. 10 is a graph of wire velocity vs. Diode Array Velocimetry (DAV) frequency, made in an experiment illustrating the principles of this invention.

The separation between laser beams at the probe volume was then verified using the rotating wire. The rate of rotation ω of the wire was determined from the number of wire crossings of the probe volume per second (burst rate). Beam separation δ was obtained from the relation $u=f\delta=2n\omega r$, where r is the wire radius of rotation. The measured wire frequencies for different wire velocities are shown in FIG. 10. The slope of the curve yields the beam-to-beam separation at the probe volume and was determined to be 120.265±0.385 μm. Therefore, beam separation at the laser source was 14 μm ±0.05%.

Figure 11:
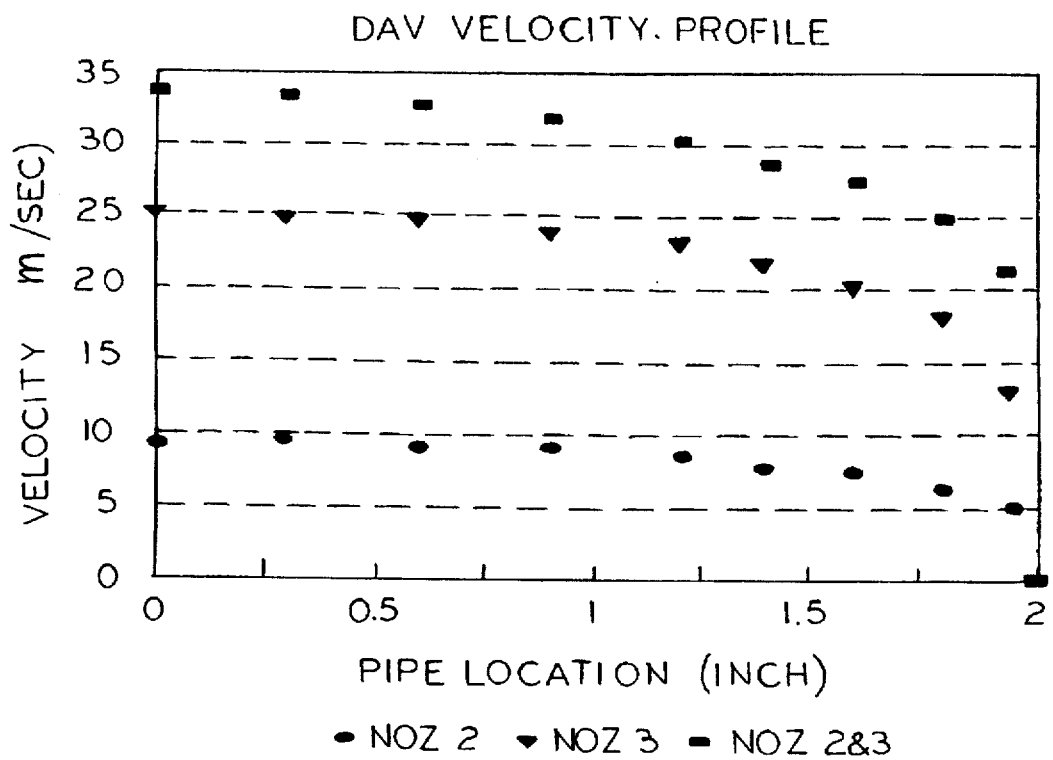
FIG. 11 is a graph of average velocity profile using DAV techniques.
Figure 12:
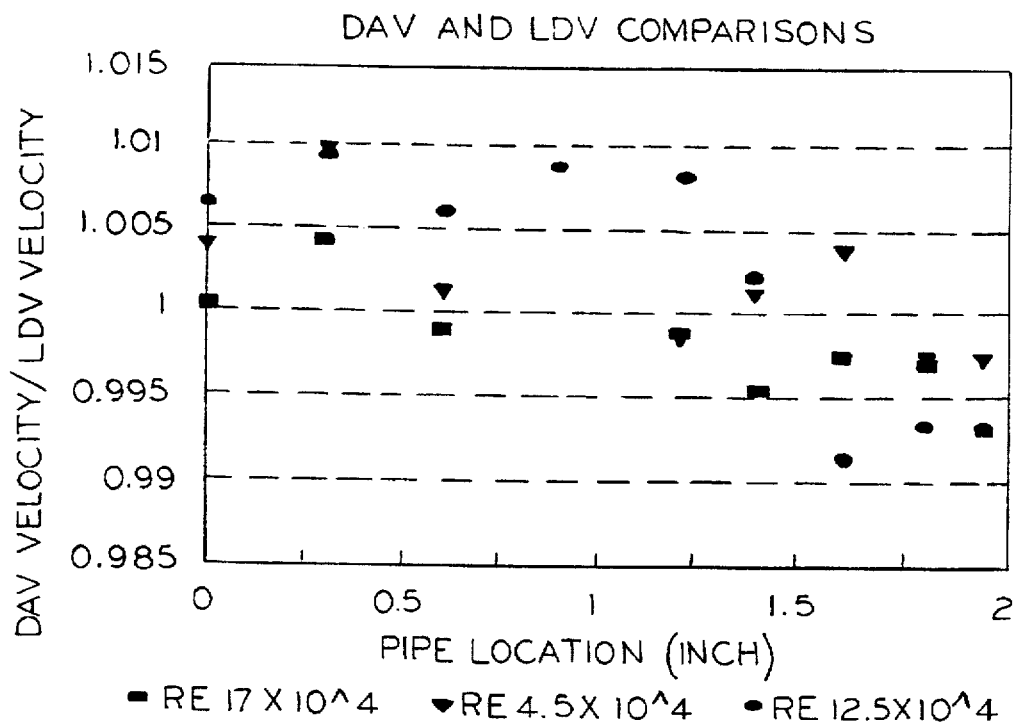
FIG. 12 is a graph which compares DAV velocity techniques with Laser Doppler Velocimetry (LDV) techniques.

DAV was used to measure the velocity profile in a wind tunnel at three Reynolds numbers: $4.5 \times 10^4$, $12.5 \times 10^4$ and $17 \times 10^4$, corresponding to an average velocity of 7, 19.4 and 26.3 m/sec. FIG. 11 shows the average velocity profile using DAV. DAV velocities were within ±1% when compared to LDV techniques, as shown in FIG. 12.

The DAV/LDV measurements were carried out over several weeks. The wind tunnel used choked sonic nozzles to control the volumetric flow rate. Ambient temperature fluctuations affected the velocity at the test section, so both DAV and LDV velocities were corrected to correspond to 15° C. However, the velocity measurements were performed over a much shorter time period than the temperature measurements. Therefore, fluctuations in the flow field might have contributed to the small discrepancies between DAV and LDV measurements.

The second embodiment of the invention also utilizes the DAV technique and other techniques for making multipoint velocity measurements. In this embodiment, however, the locations of several probe volumes are recorded on a hologram which, when illuminated by a collimated beam, reconstructs the images of the foci in each probe volume. In this way, the measurement volumes are generated where they are needed, thus optimizing the laser power. This technique has the advantage of high laser beam splitting efficiency while maintaining equal laser intensity at the multiple foci. Simultaneous multiple measurement volumes are produced without any mechanically moving parts. The hologram lens can be used in conjunction with any laser measurement system such as laser Doppler and laser transit anemometry, and laser induced fluorescence.

Figure 13:
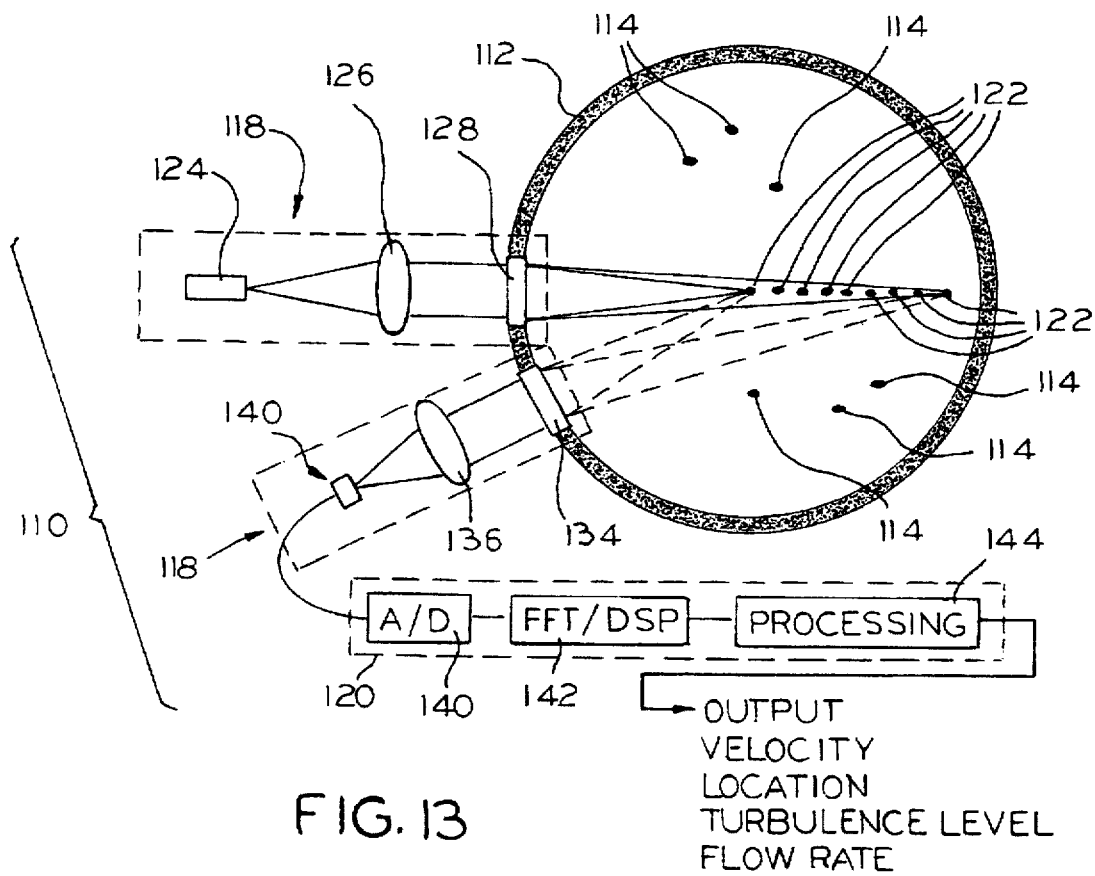
FIG. 13 is a block diagram of a second embodiment of the present invention.

As seen in FIG. 13, apparatus 110 measures the flow of gas in a pipeline 112 by calculating the velocity of particles 114 flowing in the gas. A receiver 116 responds to light from a transmitter 118 which is scattered when the light collides with particles 114 which pass through a plurality of probe volumes 122. The probe volumes 122 can be spaced along different radii of the pipeline 112, but are preferably located in radial alignment, as shown in FIG. 13.

The receiver 116 generates output signals which are input to a processor 120. The processor 120 calculates the velocity of the measured particles in the gas using the DAV techniques previously described, from which the velocity of the gas itself is determined. Velocity across the entire pipeline is measured by integrating the velocity at the several probe volumes over the entire cross-sectional area of the pipeline, yielding a velocity profile. Turbulence can also be detected with this apparatus.

The transmitter 118 includes a diode array 124 having several spaced laser diodes, shown as the array 24 in FIG. 2. Light emitted from the laser array 124 passes through a collimator lens 126, and then passes through a holographic optical element (HOE) 128. The HOE 128 is a pre-recorded holographic film. The HOE 128 is pre-recorded with the image of each of the probe volumes 122, so the probe volumes are individually illuminated with holographic light by the diode array 124.

Particles which pass through the holographic light in the probe volumes 122 scatter and reflect some of the light to a second HOE 134 in the receiver 116. The receiver HOE 134 includes a second pre-recorded holographic film, which is pre-recorded with the images of the probe volumes 122.

Light in the holographic film in the HOE 136 passes through the film to a collimating lens 136, which focusses the light on an array 138 of photodetectors, as shown in FIG. 14. The photodetectors in the array 138 produce electrical signals from which movement of the particles can be measured. A photodetector is provided for each probe volume 122, and each photodetector receives signals as in FIG. 14 when particles pass through the probe volumes.

The output signals from the photodetectors in the array 138 are sent to the processor 120, where they are converted to digital signals in an analog to digital converter 140. The digital signals are then processed in a fast Fourier transform analyzer 142, and a central processor 144 which then calculates velocity, volumetric flow rate and turbulence levels in the pipeline.

Commercially available software for performing fast Fourier transforms, and custom software for executing equation (8), can be used to make these calculations. The custom software needed can be easily developed by skilled programmers.

The data acquisition and processing system of this embodiment is shown in greater detail in FIG. 15. Signal conditioning electronics 150 accepts signals from the photodetector array 140, and includes photodetector preamplifiers, high pass filters, and low pass filters (not shown).

Five 2-channel A/D converters 152 with 10 MHz digitization frequency convert the output of the signal conditioner 150 to digital information. The digitization rate should be at least two times the Nyquist limit, which is set by the maximum velocity in the flow and the beam waist, $b_0$.

The criteria for signal validation is established through hardware and software 154. A hardware trigger circuit in the signal validation circuitry 154 with variable threshold avoids triggering on noise. The signal is valid if a particular particle has crossed all the laser sheets at every interrogation station, and the total crossing time of the probe volume does not exceed a prescribed value (matched window filter) determined by the minimum expected velocity. In addition, the Fourier transform S(f) in equation (8) can be normalized with a cosine signal and rejected if it is not high enough to indicate a valid signal. Most signal validation can be performed in software.

The digitized signals undergo Fourier transform in fast Fourier transform modules 156, to extract the frequency content. First, the digital signals are stored in buffer memory to allow an acquisition module in a processor 158 to acquire data while the processing module 156 is calculating the Fourier transform. This process is done using commercially available array processors that are plugged into a computer motherboard. Buffer memory using the standard first in first out (FIFO) process is used to allow the processing of signals while acquiring other bursts. The results can be shown on a display 160, which could be a computer monitor, a printer or the like.

The HOE lens can achieve different geometries for the foci in the probe volumes due to the process by which the hologram is constructed. A light source located at the first focal point is used to record the hologram. By moving the light source to the second focal point, a second picture can be recorded on the same hologram, and the process is repeated for all the focal points. When the hologram is reconstructed, the images of the foci are reproduced.

Image quality at the focal point, beam splitting efficiency, and shadow effects for on-axis applications will now be discussed.

Image quality at the focal point is of particular importance to laser velocimetry optics because it determines the resolution and the signal to noise ratio (SNR) of the instrument. The ability of the HOE lens to generate diffraction-limited spot size requires special considerations during the fabrication of the hologram. First, the light source used to record the hologram must be free of spherical aberrations, and must be of a size equal to the diffraction-limited spot size. Second, the wavefront distortion introduced by the holographic material must be eliminated or reduced.

The amplitude A of the reconstruction wave in the primary focus of a HOE lens of focal length f is described by the relationship, $$A(\xi,\eta,f) = Ce^{\frac{jk}{2f}(\xi^2+\eta^2)} F(b(x,y))) \quad (10)$$

where b(x,y) is the aperture function, F denotes a Fourier transform, $\epsilon$ and $\eta$ are the coordinates in the focal plane, and x and y are the coordinates in the hologram plane.

During the holographic recording process, variations in the layer thickness of the holographic recording material introduce phase distortion $\phi$ is usually very small, it can result in a substantial deformation of the measuring volume. Introducing phase distortion to the primary focus of the HOE modifies the amplitude described by equation 10 such that $$A(\xi,\eta,f) = Ce^{\frac{jk}{2f}(\xi^2+\eta^2)} \{F(b) + F(b)*F(j\phi(x,y))\} \quad (11)$$

The resolution of the holographic lens, described by equation (11), is determined from the aperture function and phase distortion of the reconstructed wave. For a top hat aperture function, equation (11) shows that if the distortion $\phi(x,y)$ contains low spatial frequencies, i.e., order of the inverse of aperture diameter, the resolution of the spot size formed by the holographic lens will be equal to the diffraction limited spot size. The hologram spatial frequency $S_f$ can be found from the relationship $$S_f = \frac{n_H - n_0}{\lambda_0} \frac{\Delta x}{L} \quad (12)$$

where $\lambda_0$ is the wavelength of incident wavefront, and $\Delta x/L$ is the thickness variation per unit length. Therefore, for a 1 cm diameter aperture, diffraction limited spot size can be obtained when the maximum thickness variation is $\leq 0.5$ $\mu m/cm$. It has been demonstrated that it is possible to fabricate a HOE lens with a thickness variation of 0.2 $\mu m/cm$. Therefore, for most optical configurations it is possible to manufacture a HOE lens with a beam quality at the measurement volume approximately the same as an aberration free lens.

The hologram diffraction efficiency is defined as the ratio of the useful image forming light intensity diffracted by the hologram to the total light intensity used to illuminate the hologram. The efficiency of splitting the incoming laser beam into multiple foci largely depends on the holographic recording material. High efficiency is obtained by recording the hologram on a dichromated gelatin (DCG) material. Efficiencies of approximately 75–90% have been reported. The quality of the images formed by a DCG hologram is best when a visible light in the 400–500 nm range is used to record the hologram. When such a hologram is constructed using a laser diode in the 700–900 nm range, a correction of the location of the foci due to chromatic aberration must be made. Silver halides allow holograms to be recorded and reconstructed in the near infrared wavelength range, thus avoiding chromatic aberrations when laser diodes are used. However, silver halides have poor diffraction efficiency, i.e., 5–10%.

Since the signal-to-noise ratio of optical instruments is proportional to the square root of the laser intensity, a uniform laser intensity at the HOE foci is required. To achieve this condition, the exposure time for each foci must be adjusted to take into account the effects of subsequent exposures. Foci-to-foci intensity variations on the order of 10% are expected due to variations in the holographic plate modulation transfer function (MTF), which affects the exposure time. For a 10% laser intensity variation, the signal-to-noise ratio at the different foci will fluctuate by 5%, which is well within the acceptable tolerance range of most optical instruments.

The building block for any geometrical arrangement of the foci is the on-axis and off-axis line configurations. For large off-axis angle applications, i.e., off-axis angles >5°, lens aberrations, including spherical aberrations, coma, and field curvature, result in large spot size. In these applications an additional lens can be used to correct the aberrations and generate a spot size about the same as the diffraction limited beam waist. The spatial resolution of the on-axis configuration is limited by the shadowing effect that occurs due to interference form the superposition of light generated by diverged beams upstream of the focal point. Beam divergence after the upstream focal point casts a shadow on the subsequent focal points. This effect is equivalent to the existence of background noise. Therefore, a signal to shadow ratio (SSR) can be defined as:

$$SSR_i = \frac{I_i}{\sum_{k=1}^{NF} I_k f^i}$$ (13)

where $I_i$ is the laser beam intensity at point i, NF is the number of on-axis focal points, and $I_k f^i$ is the diverged laser beam intensity at point i due to a beam focused at point k. The tolerable level of the SSR, which is a function of the number and location of the focal points, varies with the applications depending upon the signal-to-noise ratio and the data acquisition and processing system. Experimentally, an SSR of about 100 is adequate for most applications; however, an analysis of acceptable SSR must be conducted.

A key to previously undefined symbols used in equations (1) through (13) is shown below:

| | |
|---|---|
| a = | a lower cut-off frequency between R/m and u/δ |
| f = | frequency |
| $f_{max}$ = | maximum frequency |
| $f_{min}$ = | minimum frequency |
| I = | laser intensity |
| k = | Wave number |
| L = | Hologram thickness |
| m = | $2^N$ = Fourier transform length |
| $N_L$ = | number of laser spots |
| $n_o$ = | Index of refraction in air |
| $n_H$ = | Index of refraction of holographic material |
| R = | radius of collimating lens |
| $\dot{R}$ = | digitization rate |
| S = | signal |
| $S_f$ = | Hologram spatial frequency |
| SSR = | Signal to shadow ratio |
| t = | time |
| u = | axial velocity |
| x and y = | Hologram coordinates |
| x,y = | axial and radial coordinates, respectively |
| $w_x$ and $w_y$ = | $1/e^2$ value half width of laser beam |
| δ = | spacing between laser beams |
| Δf = | frequency resolution |
| Δx = | Thickness variation of holographic material |
| $\lambda_o$ = | Wavelength of incident wavefront |
| ξ and η = | Focal plane coordinates |

In an experiment which applied the principles of this embodiment of the invention, two HOE lenses were designed and fabricated: 3-point and 9-point HOE. The optical quality of the measurement volumes was characterized by the size of laser spot, laser beam intensity variations and signal to shadow ratio (SSR). The laser spot size at the foci was determined using a ray tracing technique. The relative intensities of the foci were measured using a silicon photodiode. The SSR was calculated using equation (13).

FIG. 16 describes the characteristics of experimental probe volumes using a 9-point HOE. The maximum focal point to focal point laser intensity fluctuations was within ±13%, resulting in maximum variation in the SNR of ±6.7%, which is well within the capabilities of most detectors' dynamic range and signal processing systems.

The spot size using HOE as determined from ray tracing was comparable to the diffraction limited spot size at the same location, as described in FIG. 16. High optical beam quality (spot size on the order of the theoretical diffraction limited spot size) at the measurement volume is important to the overall instrument signal to noise ratio. Spot sizes much larger than the diffraction limited spot size reduce both the laser power per unit area and the resulting signal, and degrades the instrument spatial resolution.

FIG. 16 shows that the SSR at the first focal point is the highest because the laser beam rays that are converging to form the focal points (downstream of the first focus) have a smaller power per unit area than the laser beam that is in focus. The SSR decreases as the contribution from the upstream foci increases. At the 5th foci, a balance is achieved between the contribution of the out-of-focus and in-focus points. The minimum SSR occurred at the 8th foci, owing to its close location to the 7th and 9th foci (dictated by the nature of the fully developed turbulent pipe flow). In general, the SSR can be optimized by taking into consideration the nature of the fluid flow and the distance between the foci.

Combining the DAV technique and the HOE lens results in an optimum procedure for multi-point velocity measurement applications. The DAV optical transmitter does not need the stringent optical requirements of an LDV, and relies on the use of collimated beam to illuminate the HOE lens. However, the HOE technique canbe integrated with the optical train of an LDV, a laser transmit anemometry (LTA), or a laser induced fluorescence (LIF) system.

In another experiment, the HOE lens was combined with the diode array velocimetry (DAV) technique described earlier, to measure the velocity at multiple points. The output of four individually addressable laser diodes (3 μm×1 μm) was collimated using a 12.5 mm focal length lens. The collimated laser beam was then used to illuminate the HOE lens. The separation of the laser beams at the foci was 85 μm. The DAV receiving optics, and data processing were similar to those used in the LDV technique.

Two sets of velocity measurement experiments were conducted to determine the performance of the HOE lens: controlled tests and wind tunnel tests. The controlled tests were performed using a wire which was projected from the edge of a rotating wheel. The wire, which simulated particles passing through the probe volume, was 75 μm in diameter. The signals from the wire had fixed amplitude, frequency and arrival time.

The flow tests were performed in a low speed wind tunnel. The test section was 10 cm in diameter and located 60 diameters downstream of the tunnel inlet. The Reynolds number, based on centerline velocity and test section diameter, varied from $3\times10^4$ to $2\times10^5$. The flow at the test section was fully developed turbulent pipe flow.

The velocity of the rotating wire was measured using the HOE lens and an achromatic lens at each focal point. The velocity statistics, i.e., average and standard deviation (RMS) of the rotating wire, were determined using 10,000 velocity samples. Since the sampling process is Poisson distributed, the corresponding statistical error was ±0.1%. The rotating wire RMS velocity using an achromatic lens was ±0.1%, i.e., within the statistical error. The RMS velocity using the HOE lens was also ±0.1%. Therefore, the velocity uncertainty due to using the HOE was dominated by the repeatability of the experiment which was within ±0.1%. A conservative conclusion would be that the velocity error due to using the HOE lens is less than ±0.1%.

The HOE-DAV method Was used to measure the centerline velocity in the wind tunnel in the Reynolds number range $3\times10^4$ to $1.7\times10^5$, which corresponds to a velocity range of 4.5 to 25 m/sec. The particle average size was 5 μm. The tunnel velocity statistics were obtained using 4,000 velocity samples at each point. The tunnel centerline average velocity was measured using HOE lens and an achromatic lens. The two velocities were within ±0.1%. The turbulence intensity level using the HOE lens correlated to within ±0.1% of the level measured using an achromatic lens.

In other actual field tests conducted using an apparatus made in accordance with FIG. 13, three sets of velocity profile measurements were made to evaluate the DAV/HOE flowmeter. First, velocity profiles were measured using a backscatter scanning laser doppler velocimeter system. Second velocity profiles were measured using a backscatter scanning DAV system. Third, velocity profiles were measured using a DOV/HOE system. For each of these velocity profiles, sonic nozzles were used as a reference measurement for the volumetric flow rate.

Since flow is chocked at the throat of the sonic nozzle, ambient temperature fluctuations affected the mass flow rate in the test loop. Variations in the mass flux resulted in variations in the measured velocities at the test section. The temperature and pressure of the air flow at the test section were measured and the measured velocities were then corrected to correspond to 70° F.

Volumetric flow rate comparisons made in the tests are summarized in FIG. 17. The DAV/HOE system was within +/−0.06% relative to the sonic nozzle.

Thus, a multi-point velocity measurement technique using a HOE lens has been developed. The location of the measurement volumes can be arranged to fall on a line, a plane, or within a volume. The HOE lens can be incorporated with a number of laser measurement techniques including LDV, LTA, and LIF to generate multiple foci.

The advantages of the invention are now apparent. Accurate flow rate and volumetric flow rate measurements can be made in pipelines, without pressure loss, measuring equipment degradation, or mechanical moving parts.

While the principles of the invention have been described above in connection with specific apparatus and applications, it is to be understood that this description is made only by way of example and not as a limitation on the scope of the invention.

What is claimed is:

1. Apparatus for measuring the flow velocity of gas in a pipeline, the gas including light-reflecting particles, comprising a transmitter which produces optical patterns in the pipeline, said transmitter having a laser diode array, said laser diode array having a plurality of individually addressable laser diodes, and at least one optical lens for focusing light produced by said diodes at discrete focal points in the pipeline, a receiver for detecting scattered radiation which is reflected by particles passing through said focal points in the pipeline, said receiver producing output signals, and a processor for calculating the flow velocity of the particles from said output signals.

2. The apparatus of claim 1 wherein said transmitter produces the optical patterns at multiple radial focal points in the pipeline, and said processing means calculates the velocity of the particles in the gas at said multiple radii.

3. The apparatus of claim 1 wherein said laser diode array includes four of said individually addressable laser diodes.

4. The apparatus of claim 1 wherein said processor includes an analog digital converter, a fast Fourier transform calculator, and a display.

5. Apparatus for measuring the volumetric flow rate of gas in a pipeline, the gas including light reflecting particles, comprising:

a transmitter which produces optical patterns in the pipeline at multiple radial focal points in the pipeline, each of said optical patterns including a plurality of spaced focal points generally aligned in the axial direction of the pipeline, said transmitter having a laser diode array which includes a plurality of individually addressable laser diodes, and at least one pre-recorded holographic optical element lens for producing said optical patterns at said multiple radial focal points, a receiver for detecting scattered radiation which is reflected by particles passing through said focal points in said optical patterns at said multiple radial focal points in the pipeline, said receiver producing output signals, and a processor for calculating the volumetric flow rate of the particles from said output signals.

6. The apparatus of claim 5 wherein said receiver includes a holographic optical element.

7. The apparatus of claim 5 wherein said processor includes signal conditioning circuitry, a multi-channel analog to digital converter, signal validation circuitry, a fast Fourier transform calculator and a display.

8. The apparatus of claim 5 wherein said receiver includes a plurality of photodetectors.

* * * * *